United States Patent [19]

Hawkes

[11] Patent Number: 5,758,277
[45] Date of Patent: May 26, 1998

[54] TRANSIENT ANALYSIS SYSTEM FOR CHARACTERIZING RF TRANSMITTERS BY ANALYZING TRANSMITTED RF SIGNALS

[75] Inventor: Kelly Davidson Hawkes, Los Altos, Calif.

[73] Assignee: Corsair Communications, Inc., Palo Alto, Calif.

[21] Appl. No.: 716,840

[22] Filed: Sep. 19, 1996

[51] Int. Cl.$^6$ .............................. H03C 1/62; H04B 17/00
[52] U.S. Cl. .............................. 455/410; 455/411
[58] Field of Search .................. 380/23, 25; 455/410, 455/425, 67.1, 411; 324/76.12; 364/728.07, 728.03; 379/145

[56] References Cited

U.S. PATENT DOCUMENTS

| | | | |
|---|---|---|---|
| 4,255,791 | 3/1981 | Martin | 364/514 |
| 4,366,349 | 12/1982 | Adelman | 179/107 |
| 4,637,046 | 1/1987 | Sluijter et al. | 381/49 |
| 4,768,174 | 8/1988 | Castle | 367/39 |
| 4,955,049 | 9/1990 | Ghisler | 379/58 |
| 5,005,210 | 4/1991 | Ferrell . | |
| 5,237,612 | 8/1993 | Raith | 380/23 |
| 5,260,708 | 11/1993 | Auterman | 342/25 |
| 5,282,250 | 1/1994 | Dent et al. | 380/23 |
| 5,307,070 | 4/1994 | Runge et al. | 342/25 |
| 5,329,591 | 7/1994 | Magrill . | |
| 5,335,265 | 8/1994 | Cooper et al. | 379/59 |
| 5,345,595 | 9/1994 | Johnson et al. | 455/33.1 |
| 5,386,495 | 1/1995 | Wong et al. | 375/10 |
| 5,420,910 | 5/1995 | Rudokas et al. | 379/59 |
| 5,428,814 | 6/1995 | Mort et al. | 455/12.1 |
| 5,448,760 | 9/1995 | Frederick . | |
| 5,459,815 | 10/1995 | Aikawa et al. | 395/2.63 |
| 5,495,242 | 2/1996 | Kick et al. | 340/902 |
| 5,555,551 | 9/1996 | Rudokas et al. | 379/59 |
| 5,557,676 | 9/1996 | Naslund et al. | 380/23 |
| 5,655,004 | 8/1997 | Holbrook | 455/411 |
| 5,659,318 | 8/1997 | Madsen et al. | 342/25 |
| 5,706,333 | 1/1998 | Grenning et al. | 379/59 |

OTHER PUBLICATIONS

System Description Phoneprint(tm) Corsair Communications, pp.: 1–26, May 1995.
Bernard Sklar, Digital Communications Fundamentals and Applications, pp.: 17–18, 22–27 and 29, 1988.
Alvan Oppenheim, Discrete–Time Signal Processing, pp.: 63–67 and 837–842, 1989.
Oppenheim et al., "Digital Signal Processing," Prentice–Hall, 1975, pp. 361–365.
Duda et al., "Pattern Classification and Scene Analysis," John Wiley & Sons, 1973, pp. 114–126.

*Primary Examiner*—Tommy P. Chin
*Assistant Examiner*—David R. Vincent
*Attorney, Agent, or Firm*—David E. Lovejoy

[57] ABSTRACT

A transient analysis system that characterizes the transients in RF signals from radio transmitters. Transient characterization permits identification of the transmitter and is useful in cellular telephone fraud prevention systems. The characterization is based on the analysis of the chirp waveform or the complex auto-correlation sequence.

12 Claims, 8 Drawing Sheets

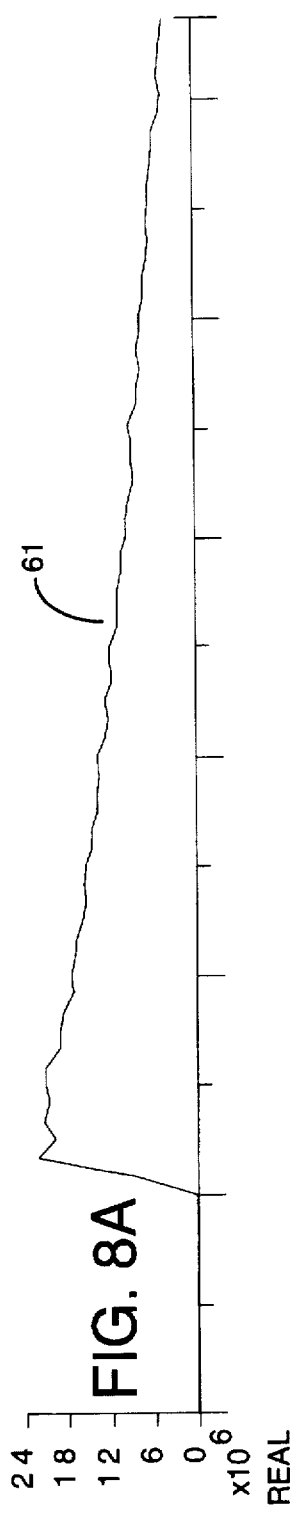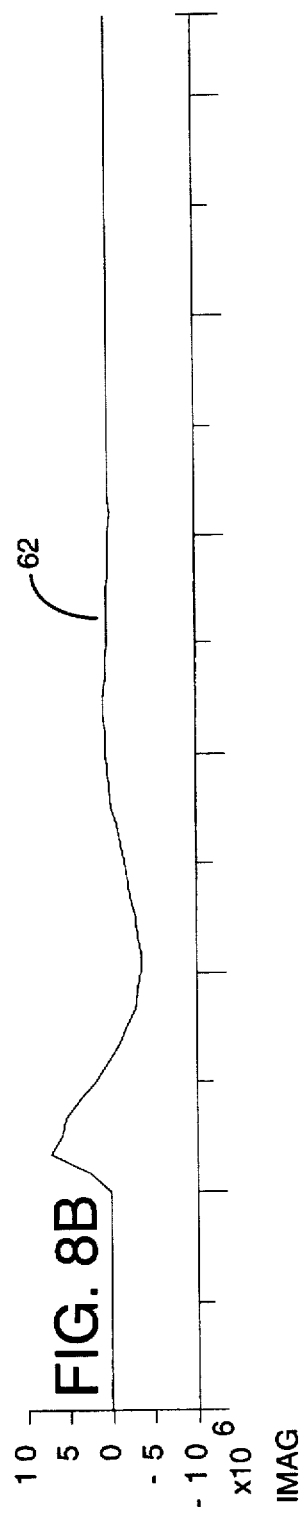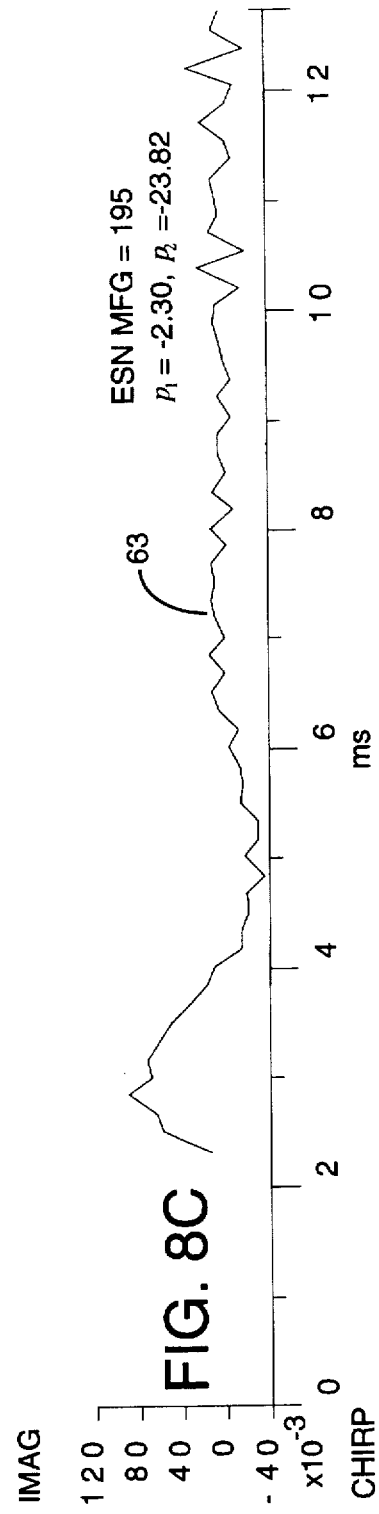

TRANSIENT ANALYSIS SYSTEM FOR CHARACTERIZING RF TRANSMITTERS BY ANALYZING TRANSMITTED RF SIGNALS

CROSS-REFERENCED APPLICATION

"Fraud Prevention System" SC/Ser. No.: 08/576,116 Filed Date: Dec. 21, 1995 Assignee: Corsair Communication Attorney Doc. No.: CORS1014DEL

BACKGROUND OF THE INVENTION

This invention relates to the characterization of transients found in radio frequency (RF) transmitters and particularly to methods and apparatus for distinguishing among RF transmitters, such as cellular phone transmitters, based upon transient characteristics.

There are many causes of transients in transmitted signals. For example, the frequency of a carrier may deviate from a nominal value due to a power supply current surge when the RF power is turned on. Some cellular phones transmit a transient at the beginning of the reverse control channel (RECC) transmission. Another transient may occur at the end of frequency shift keyed (FSK) modulation, during the post-carrier period of the RECC transmission. These transients are typically different from one cellular phone to another and can be used to provide parameters in the form of numerical values that characterize the cellular phone transmission. There is a need for new techniques for deriving parameters from the transient portions of cellular telephone transmissions that can be used to detect unauthorized access by cloned cellular phones.

Parameters are used in the "Cellular Telephone Anti-Fraud System" of U.S. Pat. No. 5,448,760, in the "Transmitter Identification and Validation System" of U.S. Pat. No. 5,329,591 and in the "Fraud Prevention System" of the above-identified cross-referenced application to detect unauthorized access to a cellular telephone network by cloned cellular phones. Cloned cellular phones are phones that have been illegally programmed or otherwise have unauthorized use of MIN/ESN identification codes of legitimate subscribers.

Ferrell in the "Method and Apparatus for Characterizing a Radio Transmitter" of U.S. Pat. No. 5,005,210 discloses an apparatus for characterizing a radio transmitter based on the analysis of the frequency or phase waveform output from a receiver that intercepts the transmitted signal. Ferrell uses a frequency discriminator to produce a frequency waveform for analyzing a transient with a signal-to-noise ratio that may have an advantage when processing medium to high signal-to-noise ratio intercepts. However, the Ferrell system is limited in that it requires the transient to be referenced to a predetermined frequency. Ferrell uses a natural period and a damping factor to describe the transient, but at times these parameters may not be the best parameters for an unauthorized-use system that distinguishes one cellular telephone from another.

Accordingly, there is a need for a method of and apparatus for deriving good parameters for characterizing transmitters, that is, parameters which have low variance from intercept to intercept for the same transmitter but which are substantially different from one transmitter to another.

SUMMARY OF THE INVENTION

The present invention is a transient analysis system that characterizes the transients in RF signals from radio frequency (RF) transmitters. The transient information is derived from two different waveforms, the complex auto-correlation (CAC) sequence or the chirp waveform. These waveforms are not frequency nor phase waveforms. These waveforms are used to analyze a transient and extract meaningful parameters that characterize the transient. Chirp waveform analysis has the advantage of not requiring the transient to be referenced to a predetermined frequency.

Although this invention is useful for analyzing transmitters having a principal modulation that is frequency modulation (FM), the CAC sequence or the chirp waveform can be used to analyze transients that come from any transmitter, such as amplitude modulation (AM), amplitude shift-keyed (ASK) modulation, frequency shift-keyed (FSK) modulation, or quadrature phase shift-keyed (QPSK) modulation.

This invention employs robust techniques of time registering transients so that the derived parameters are consistent from one intercept to another for the same transmitter.

The foregoing and other objects, features and advantages of the invention will be apparent from the following detailed description in conjunction with the drawings.

BRIEF DESCRIPTION OF THE DRAWINGS

FIG. 8A is a plot of the real component of the CAC, FIG. 8B is a plot of the imaginary component of the CAC, and FIG. 8C is a plot of the chirp waveform for another cellular telephone during the first 10 ms of its RF transmission.

DETAILED DESCRIPTION

Figure 1:
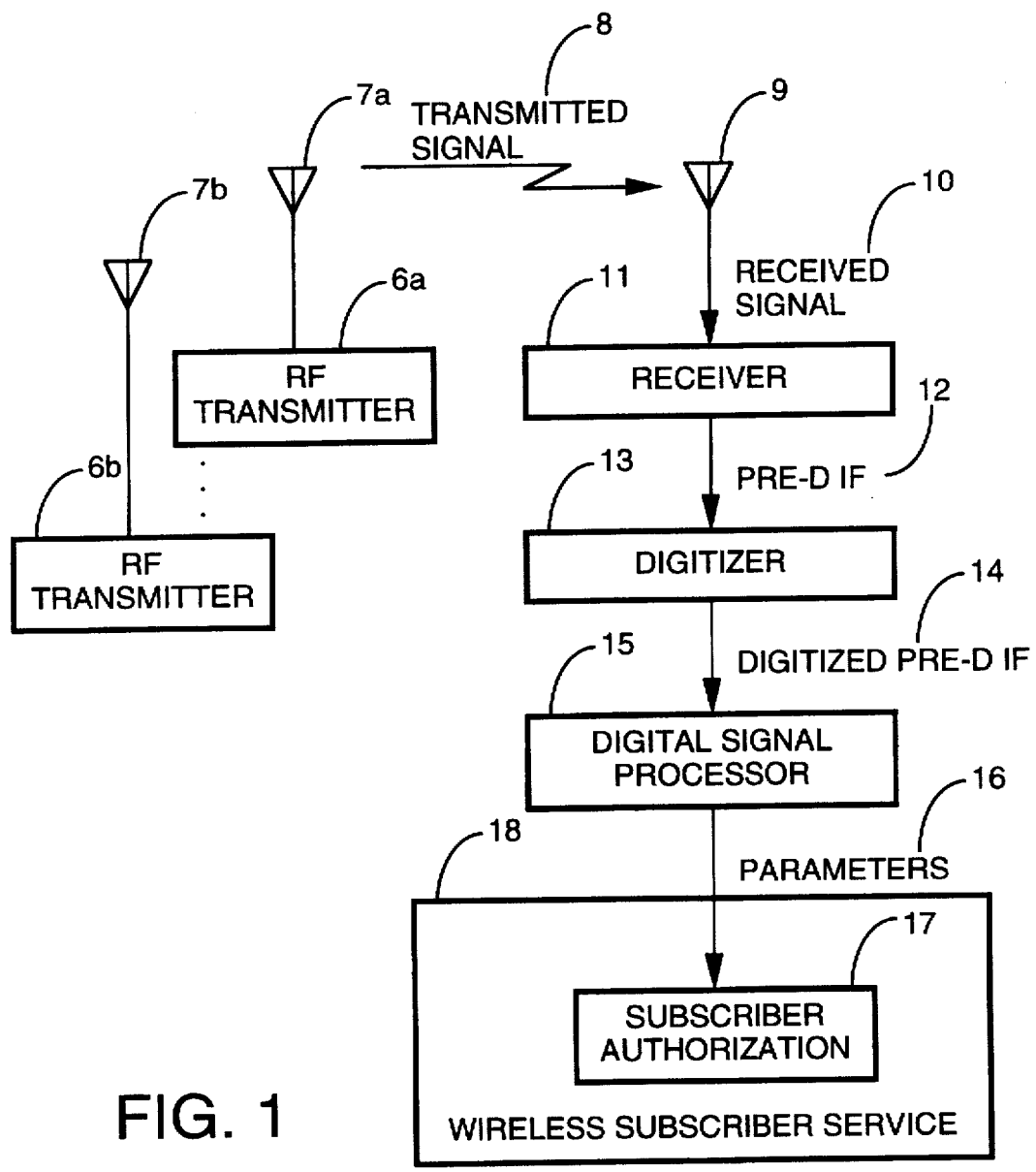
FIG. 1 is a block diagram of the equipment used to characterize transmitters in a wireless communications system.

FIG. 1 shows one preferred embodiment of this invention. The transmitter 6a, typical of a plurality of transmitters 6a, . . . , 6b, radiates an RF signal 8 from its antenna 7a. The transmitted signal 8 is received by the receiving antenna 9. The received signal 10 to be characterized is processed by a receiver 11. There are several ways to connect the transmitted signal 8 to the receiver 11. FIG. 1 shows the transmitter broadcasting the RF signal 8 and the receiver processing the output of a receive antenna 9. Another method is to record the received signal 10 on tape and later connect the received signal 10 as an output of the tape to the receiver 11. A third method is to provide a coaxial cable connection between the transmitter 6a and the receiver 11 thereby bypassing any RF transmission.

The receiver 11 isolates a narrow-band portion of the RF spectrum, amplifies it, and down-converts it to an intermediate frequency (IF) as a pre-detection IF signal 12. The IF signal 12 is applied to an analog-to-digital converter (digitizer) 13 that periodically samples the IF signal and represents the instantaneous voltage of the IF signal 12 with a numerical code in the form of a pre-detection intermediate frequency sequence 14 formed of digitized samples that are sent to a digital signal processor 15. Signal processor 15 is a computer or other processor that operates on the digitized samples. An alternative configuration is to send the samples of sequence 14 to a storage disk and then play the samples back to the digital signal processor 15. Another alternative is to have the digitizer 13 remote from the digital signal processor 15 intercommunicating with signal processor 15 across a network using communication devices such as modems or ethernet circuit cards. The digital signal processor 15 operates on the samples to characterize the transients of the transmitter signal 8 thereby producing parameters 16 which are numerical representations of the transmitter's transient characteristics.

In FIG. 1, the parameters 16 from processor 15 are received by the subscriber authorization subsystem 17 which forms part of the wireless subscriber service 18. The subsystem 17 uses the parameters 16 to take or signal appropriate action in connection with authorized and unauthorized users of the system. For example, the subsystem 17 upon detection of a fraudulent or other unauthorized user may signal or force tear-down of the call by the unauthorized user. The subscriber authorization subsystem 17 includes a comparison means (not shown) for determining the likelihood that the parameters are typical of a specific transmitter. The comparison means is further described in the above-identified cross-referenced application.

Figure 2:
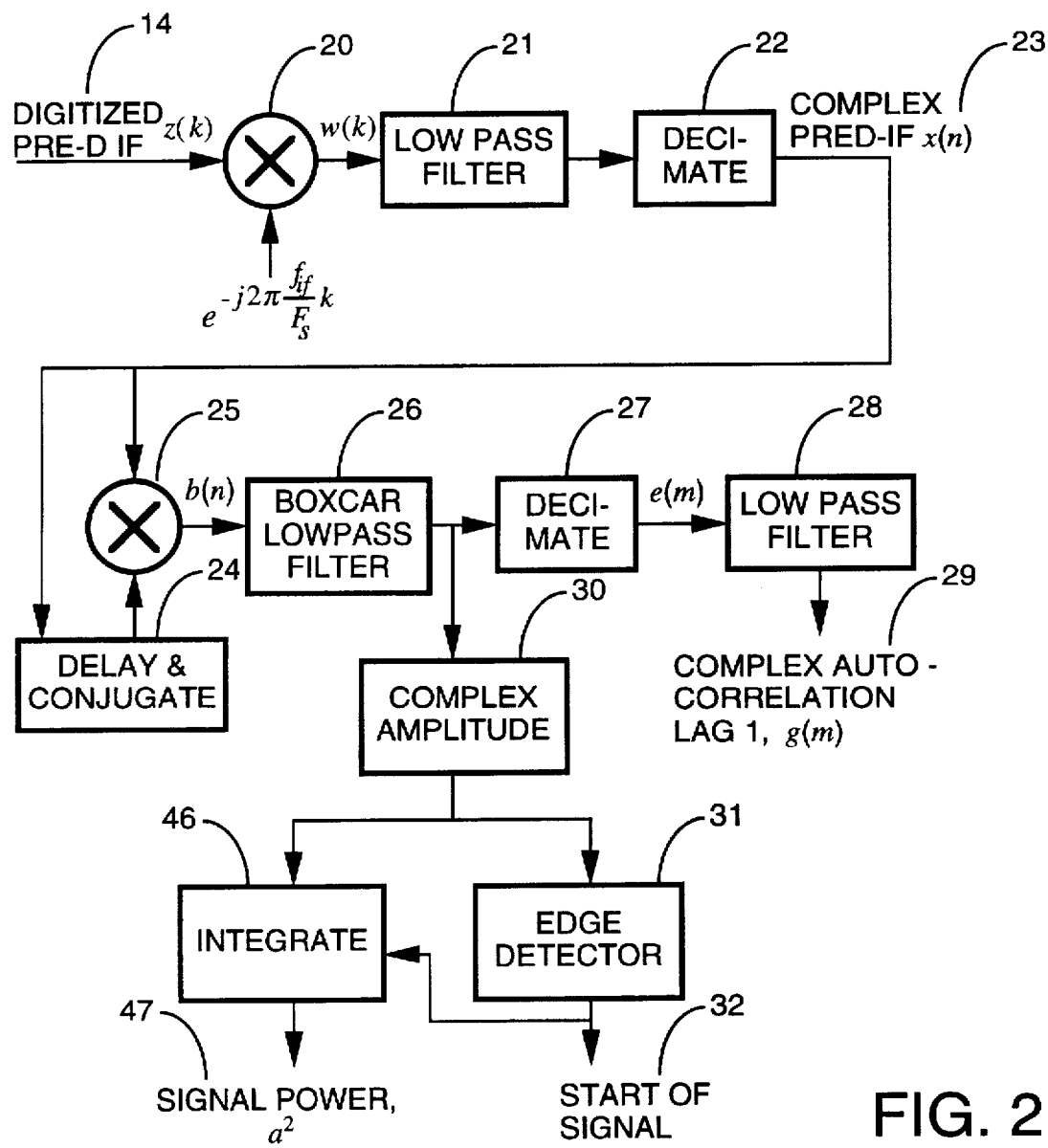
FIG. 2 is a signal generator signal processing block diagram for the software in the digital signal processor that determines the start of signal, signal power and the complex auto-correlation (CAC) sequence based on the digitized pre-detection intermediate frequency (IF) samples.

FIG. 2, FIG. 3, FIG. 4, FIG. 5, and FIG. 6 are signal processing block diagrams that, in one preferred embodiment, are implemented as software in the digital signal processor 15. However, hardware implementations are, of course, possible. In FIG. 2, the digital samples 14 are received from the digitizer 13 of FIG. 1. The samples 14 are multiplied in multiplier 20 by a complex sinusoid to down-convert the signal 14 to 0 Hz and then are filtered in lowpass filter 21 to remove the negative frequency components forming an analytic (complex) signal. If z(k) are the digital samples 14 from the A/D converter 13 of FIG. 1, then the output of the multiplier 20, w(k), is:

$$w(k) = e^{-j2\pi \frac{f_{if}}{F_s} k} z(k) \qquad \text{Eq. (1)}$$

The complement of the frequency of the complex sinusoid is the nominal pre-detection IF frequency, $f_{if}$. The output of the multiplier is lowpass filtered in filter 21 and the sample rate is reduced by a decimation index of D' by the decimator 22 thereby forming the complex pre-detection IF sequence, x(n), 23. The lowpass filter 21 with filter coefficients $h_i$ and decimator 22 implement x(n) as follows:

$$x(n) = \sum_{i=0}^{l-1} h_i w(nD' - i) \qquad \text{Eq. (2)}$$

The mixer 20, lowpass filter 21, and decimator 22 can be incorporated into a computationally efficient polyphase filter when the pre-detection IF frequency, $f_{if}$, is near one-fourth of the sample rate, $F_s/4$. Suitable polyphase filter technology is described by Ronald E. Crochiere and Lawrence R. Rabiner in "Multirate Digital Signal Processing," Prentice-Hall, 1983, particularly pages 48 to 58 and 267 to 280. There are several other methods of computing a complex signal from a real signal readily apparent to those skilled in the art, such as a Hilbert transform as described by Alan V. Oppenheim and Ronald W. Schafer in "Digital Signal Processing," Prentice-Hall, 1975, particularly pages 361–365. A third method of generating a complex sequence from a real sequence is to let the digitized pre-detection IF signal z(n) be the real component of the complex pre-detection IF sequence x(n) 23 and, with an analog filter, phase shift the pre-detection IF signal by 90 degrees and digitize it to form the imaginary component of the complex pre-detection IF sequence.

The complex pre-detection IF sequence x(n) 23 is delayed by one sample and conjugated in block 24 to form x*(n−1), and the result is then multiplied in multiplier 25 by the non-delayed version of the complex pre-detection IF sequence x(n) to form the b(n) sequence:

$$b(n)=x^*(n-1)x(n) \qquad \text{Eq. (3)}$$

The b(n) sequence is filtered in lowpass filter 26, decimated in decimator 27 and filtered in lowpass filter 28 further to form the complex auto-correlation sequence 29 which is also referred to as the CAC sequence g(m). The output of the decimator 27 is e(m):

$$e(m) = \frac{1}{K} \sum_{i=0}^{i=K-1} b(mD - i) \qquad \text{Eq. (4)}$$

where K is the length of the boxcar filter 26 and D is the decimation index of the decimator 27. The output of the lowpass filter 28 is the CAC sequence g(m):

$$g(m) = \sum_{i=0}^{i=L-1} l_i e(m - i) \qquad \text{Eq. (5)}$$

where the filter coefficients of lowpass filter 28 are $l_i$. The CAC sequence may be calculated using any amount of time delay; a lag of one sample is shown in FIG. 2 and Eq. (3). The bandwidths of the filters and the decimation ratio are dependent upon whether the transient analysis system for RF transmitters is processing slow or fast transients. Note that the derivation of the CAC 29 in this invention does not use an FM receiver, instantaneous frequency to voltage converter, phase detector, frequency discriminator, means for sampling the phase of the received signal, nor a frequency difference signal detector and accordingly the present invention is not dependent on a predetermined frequency.

The output of the lowpass filter 26 is AM detected by a complex magnitude detector 30 which computes the square root of the sum of the squares of the real and imaginary components. One skilled in the art could formulate other amplitude detectors, for example, by extracting the real component of the complex signal or summing the absolute values of the real and imaginary parts. The output of the AM detector 30 is processed by an edge detector 31 to generate a start of signal 32. The edge detector 31 determines when the signal starts by looking for an increase in amplitude. There are many techniques for performing rising edge detection. For example, a highpass filter followed by a lowpass filter, in turn followed by a peak finder can be employed. Typically, the ratio of the 3 dB frequency of the lowpass filter to the 3 dB frequency of the highpass filter is 3:1. The start of signal 32 is the sample number of the CAC of the beginning of the signal. The start of signal enables an integrator 46 that estimates the received signal power 47, $\alpha^2$, over a fixed interval of time. For cellular telephone transients, a duration of 6 ms is adequate for the integrator 46.

Figure 3:
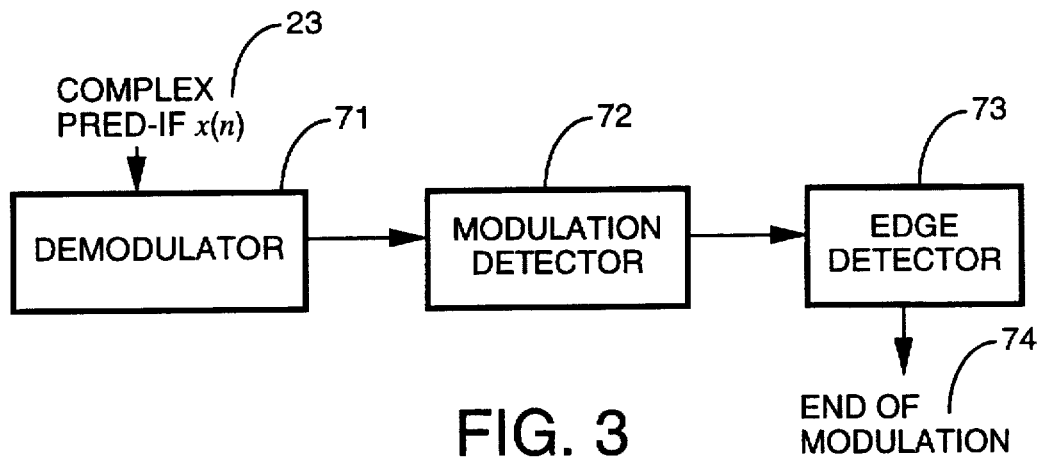
FIG. 3 is a end of modulation detector signal processing block diagram that represents how the end of modulation (EM) is found.

Some cellular telephones have a transient that occurs when the FSK modulation stops and the post-carrier continues. FIG. 3 is an end of modulation detector that represents one technique to find the end of modulation. The complex pre-detection signal 23 is demodulated in demodulator 71 to produce a demodulated waveform. The demodulator 71 is specific to the type of signal being processed. For example, an ASK demodulator would be used for signals with ASK modulation. The modulation detector 72 operates on the demodulated waveform and outputs a value indicating the relative presence of modulation for each bit. Values near 0 are generated during post-carrier and values near 1 are generated when the modulation is present. Other representations are readily apparent to those skilled in the art. For example, for Manchester encoded data, a matched filter followed by an absolute value detector would serve as a modulation detector. The edge detector 73 operates on the output of the modulation detector 72 to find the sample number 74 that corresponds to the end of modulation. There are many techniques for performing falling edge detection. For example, a highpass filter followed by a lowpass filter followed by a minimum finder would suffice. A 3 dB frequency of 0.1R for the highpass filter and 0.3R for the lowpass filter have successfully been used where R is the bit rate.

Figure 4:
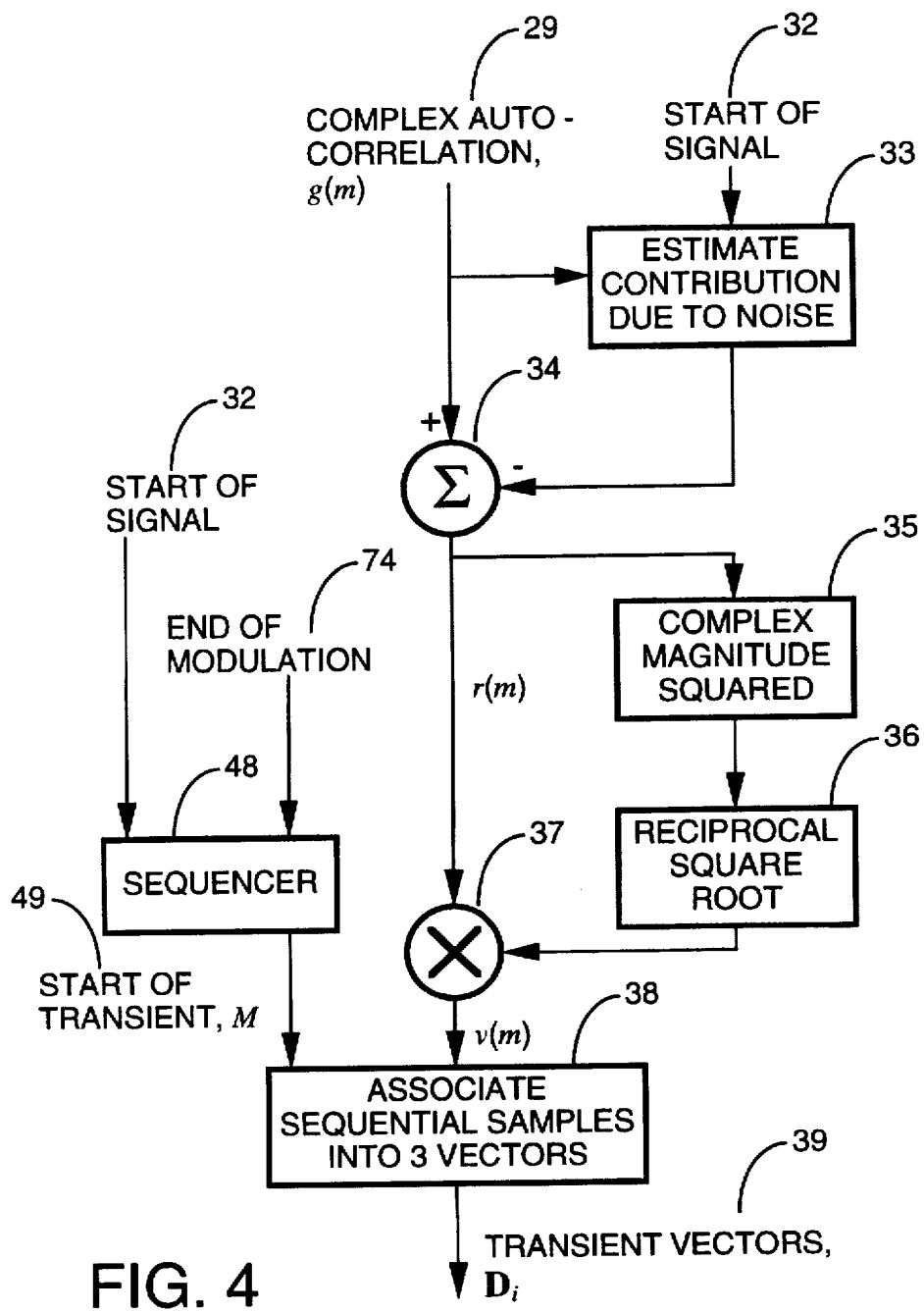
FIG. 4 is a transient vector signal processing block diagram that represents one technique of computing transient vectors (TV) from the CAC.
Figure 5:
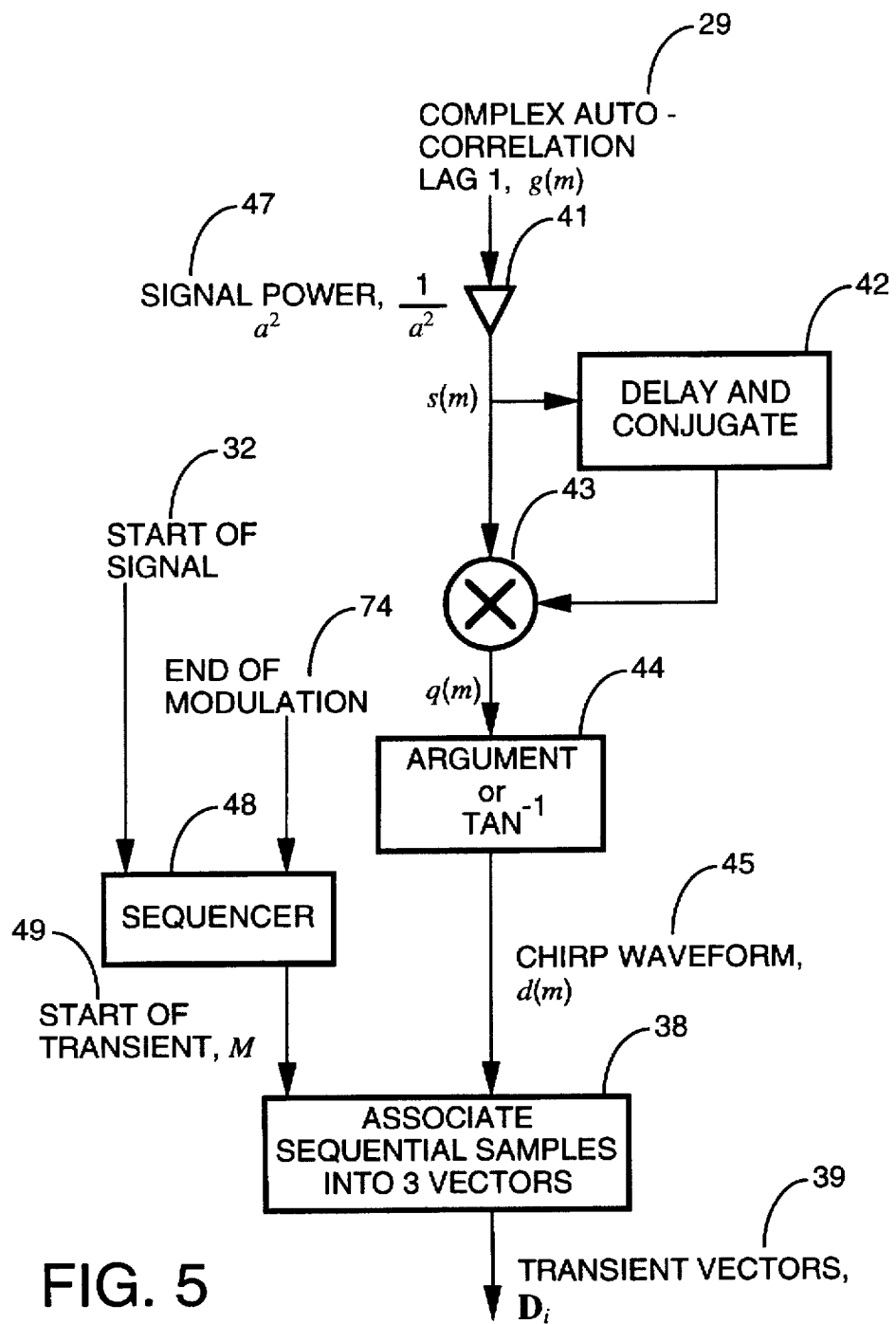
FIG. 5 is a transient vector signal processing block diagram that represents another technique of computing transient vectors (TV) based on the chirp waveform (CW) which is derived from the CAC.

Some transmissions may contain transients at both the start of signal and at the end of modulation. FIG. 4 and FIG. 5 are transient vector generators that include a sequencer 48 that causes the signal processing to be repeated for transients that occur at the start of signal and at the end of modulation.

Referring to FIGS. 2, 3, 4 and 5, the determining means for determining a portion of the chirp waveform to analyze include the complex amplitude block 30, the edge detector block 31 and the integrate block 46 of FIG. 2, the demodulator 71, modulation detector 72 and edge detector 73 of FIG. 3, and the sequencer 48 of FIG. 4 or FIG. 5.

For those transmissions that contain a transient at the beginning of the transmission, the start of signal 32 is used for the start of transient sample number 49. For those transmissions that contain a transient at the beginning of post-carrier, the end of modulation 74 is used for the start of transient 49. The start of transient is the sample number, M, of the CAC that contains the beginning of the transient. The start of transient is used by subsequent signal processing 38 to isolate the transient in time.

Figure 7A:
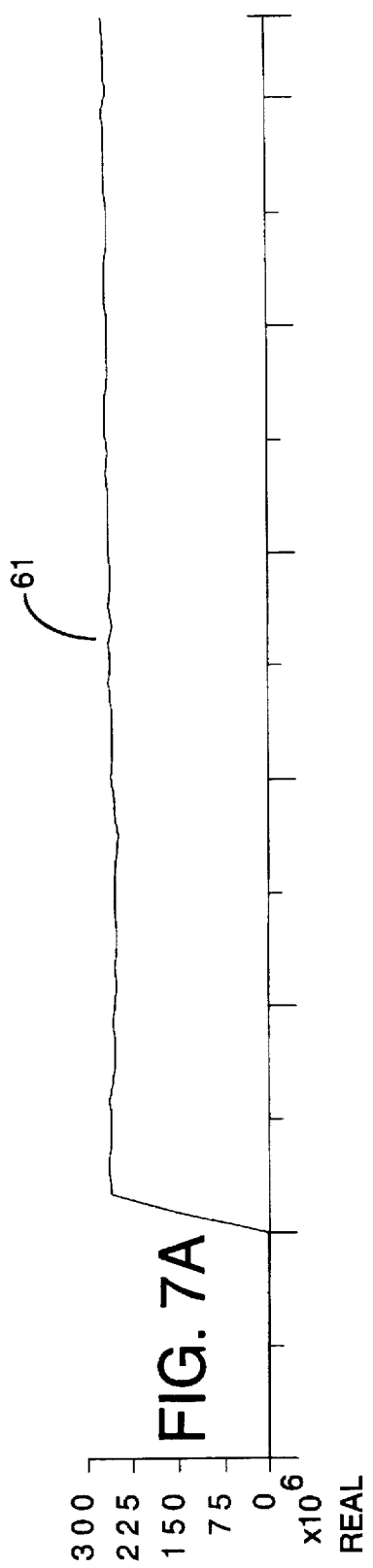
FIG. 7A is a plot of the real component of the CAC.
Figure 7B:
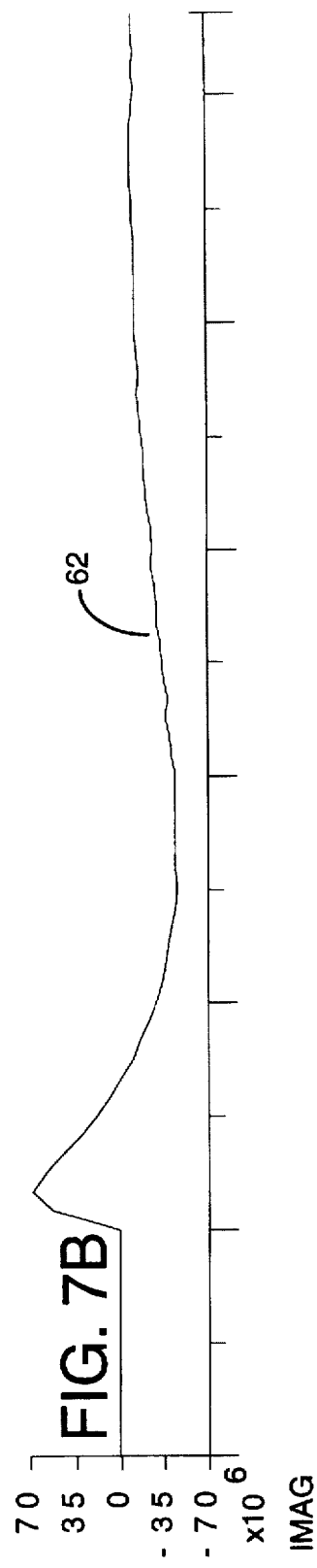
FIG. 7B is a plot of the imaginary component of the CAC.

FIG. 7A and FIG. 7B are the real 61 and imaginary 62 components of the CAC 29 for a cellular telephone with ESN manufacturing code 130. FIG. 8A and FIG. 8B are the real and imaginary components respectively of the CAC for a different cellular telephone with ESN manufacturing code 195. The horizontal axis is time in ms. From 0 to 2 ms the cellular phone is off and then begins transmission at t=2 ms. The real component 61 makes an abrupt amplitude increase at t=2.1 ms which triggers the edge detector 31. The transient characteristic is mainly contained in the imaginary component 62. If several intercepts from the same transmitter were obtained and the edge detector 31 determined the start of the transient with substantial timing errors, then the time isolated portion of the imaginary waveform 62 used for subsequent analysis would vary from intercept to intercept. Thus, the edge detector 31 must be robust so that the transient analysis system for RF transmitters produces the same parameters from intercept to intercept of the transmitter signal.

FIG. 4 depicts a transient vector generator that shows one technique of converting the CAC into transient vectors. Prior to the start of the signal 32, the long term average of the CAC due to noise is computed in estimator 33. The start of signal is used to stop the averaging process to ensure that the noise estimate does not contain any signals. The noise component of the CAC is subtracted in subtractor 34 from the CAC to estimate the signal component r(m) of the CAC:

$$r(m) = g(m) - \frac{1}{J_E - J_S + 1} \sum_{i=J-J_S}^{J-J_E} g(i) \qquad \text{Eq. (6)}$$

where J is the start of signal 32, $J_s$ is the offset to the start of the noise averaging process 33, and $J_E$ is the offset to the end of the averaging process and is usually a positive number of samples to ensure that the turn on of the signal does not contaminate the noise estimate. This noise estimate assumes that the cross products of the signal and the noise in the multiplier 25 average out to zero by the lowpass filter 28 of FIG. 2. The subtraction 34 in FIG. 4 makes the algorithm less sensitive to the noise generated by the receiver and permits this transient characterization system to operate at a low signal-to-noise ratio. Each CAC sample is normalized so that each has a magnitude of unity. FIG. 8A shows the signal fading from t=2 ms to t=12 ms. Normalization removes the effects of fading. An efficient normalization technique is to compute in unit 35 the sum of the real component squared and the imaginary component squared, find the reciprocal square root in unit 36, and multiply in multiplier 37 the CAC by the reciprocal of its magnitude to form the normalized value v(m):

$$v(m) = r(m) \frac{1}{\sqrt{r_r^2(m) + r_i^2(m)}} \qquad \text{Eq. (7)}$$

Other methods of normalizing a complex number are readily apparent to those skilled in the art. The normalized complex auto-correlation, v(m), sequence is separated into three transient vectors, $D_0$, $D_1$, and $D_2$. The first element of the first vector is based on the start of transient sample number M. The real and imaginary components alternate. The second vector is time shifted by one sample with regard to the first vector. The third vector is time shifted by two samples with respect to the first vector. Each vector is N elements long and they are expressed as follows:

$$D_0 = \begin{bmatrix} v_r(M+0) \\ v_i(M+0) \\ v_r(M+1) \\ \cdot \\ \cdot \\ \cdot \\ v_i\left(M + \frac{N}{2} - 1\right) \end{bmatrix}, D_1 = \begin{bmatrix} v_r(M+1) \\ v_i(M+1) \\ v_r(M+2) \\ \cdot \\ \cdot \\ \cdot \\ v_i\left(M + \frac{N}{2}\right) \end{bmatrix}, \qquad \text{Eq. (8)}$$

$$D_2 = \begin{bmatrix} v_r(M+2) \\ v_i(M+2) \\ v_r(M+1) \\ \cdot \\ \cdot \\ \cdot \\ v_i\left(M + \frac{N}{2} + 1\right) \end{bmatrix}$$

If the peak frequency deviation of the transient is small compared to the decimated sample rate, then, the majority of the transient information is contained in the imaginary component, as shown in FIG. 7B and the transient vectors can then be formed with only the imaginary component of the normalized CAC:

$$D_0 = \begin{bmatrix} v_i(M+0) \\ v_i(M+1) \\ \vdots \\ v_i(M+N-1) \end{bmatrix}, D_1 = \begin{bmatrix} v_i(M+1) \\ v_i(M+2) \\ \vdots \\ v_i(M+N) \end{bmatrix}, \quad \text{Eq. (9)}$$

$$D_2 = \begin{bmatrix} v_i(M+2) \\ v_i(M+3) \\ \vdots \\ v_i(M+N+1) \end{bmatrix}$$

FIG. 5 shows another transient vector generator which employs an alternate technique of converting the CAC into transient vectors. Either the signal processing of FIG. 4 or of FIG. 5 is implemented; it is not necessary to have both to derive the transient vectors.

In FIG. 5, the amplitude of the CAC is adjusted in amplifier 41 to reduce its dynamic range. The gain of the amplifier 41 is the reciprocal of the signal power signal 47 from FIG. 2.

$$s(m) = \left[\frac{1}{a^2}\right] g(m) \quad \text{Eq. (10)}$$

The output of the amplifier s(m) is delayed and conjugated in block 42 to form s*(m−1) and multiplied in multiplier 43 to produce the q(m) sequence:

$$q(m) = s(m) \, s^*(m-1) \quad \text{Eq. (11)}$$

The argument of each complex q(m) sample is found using an arc-tangent algorithm block 44 to produce the chirp waveform 45, d(m):

$$d(m) = \frac{1}{D} \arg[q(m)] \quad \text{Eq. (12)}$$

The chirp waveform d(m) is loaded into the transient vectors based on the start of transient 49, sample number M to form the transient vectors:

$$D_0 = \begin{bmatrix} d(M+0) \\ d(M+1) \\ \vdots \\ d(M+N-1) \end{bmatrix}, D_1 = \begin{bmatrix} d(M+1) \\ d(M+2) \\ \vdots \\ d(M+N) \end{bmatrix}, \quad \text{Eq. (13)}$$

$$D_2 = \begin{bmatrix} d(M+2) \\ d(M+3) \\ \vdots \\ d(M+N+1) \end{bmatrix}$$

Chirp is the rate of change of frequency. FIG. 2 and FIG. 5 show the processing means to extract a chirp waveform from a signal. To illustrate the concept of chirp, let the transient portion of the complex pre-detection IF sequence 23, x(n), be modeled by:

$$x(n) = \alpha e^{j(\frac{1}{2}cn^2 + \omega n + \phi)} \quad \text{Eq. (14)}$$

where n is the sample number, α is the signal amplitude, c is the chirp, ω is the carrier frequency, and φ is the carrier phase of the received signal. Although the present invention does not compute nor use the phase sequence, for the input signal under consideration, the phase sequence, p(n), is represented for purpose of comparison as follows:

$$p(n) = \tfrac{1}{2}cn^2 + \omega n + \phi \quad \text{Eq. (15)}$$

Likewise, the present invention does not compute nor use the frequency sequence but, for the input signal under consideration, again for purpose of comparison, the frequency sequence, f(n), can be represented as the derivative of the phase sequence as follows:

$$f(n) = cn + \omega \quad \text{Eq. (16)}$$

The derivative of the frequency sequence f(n) is the chirp sequence:

$$d(n) = c \quad \text{Eq. (17)}$$

which shows that c is indeed the amount of chirp in the input signal. Although the present invention has been described in an embodiment that does not use a frequency discriminator, the chirp waveform can be generated by a filter operating on the output of a frequency discriminator and performing a differentiating function.

In FIG. 2, for the input signal under consideration, the output of the first delay-conjugate multiplier 25 is:

$$b(n) = a^2 e^{j(cn - \frac{c}{2} + \omega)} \quad \text{Eq. (18)}$$

Assuming that the transient is long with respect to the duration of the lowpass filters 26 and 28 and that they have unity passband gain, the CAC sequence is approximately:

$$g(m) = a^2 e^{j(cDm - \frac{c}{2}(K+L) + \omega)} \quad \text{Eq. (19)}$$

where m is the decimated sample number.

Referring to FIG. 5, the output of the gain adjustment 41 is:

$$s(m) = e^{j(cDm - \frac{c}{2}(K+L) + \omega)} \quad \text{Eq. (20)}$$

The output of the multiplier 43 is:

$$q(m) = e^{jcD} \quad \text{Eq. (21)}$$

The output of the arc-tangent block 44 is the chirp waveform:

$$d(m) = c \quad \text{Eq. (22)}$$

which shows that the signal processing of the transient analysis system for RF transmitters of the present invention indeed extracts the chirp waveform without using the phase or frequency waveforms. Note that the chirp waveform of Eq. (22) is not related to nor sensitive to the carrier amplitude, carrier phase, nor carrier frequency of the received signal. The center frequency of the carrier, ω, can vary from intercept to intercept but the chirp waveform per Eq. (22) remains unchanged. Consequently, the chirp waveform is not dependent upon a predetermined frequency.

Figure 7C:
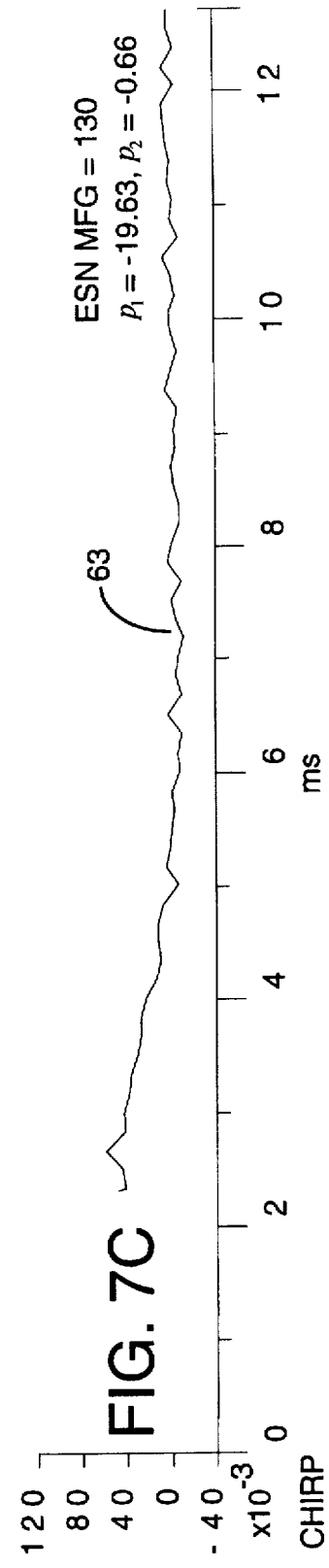
FIG. 7C is a plot of the chirp waveform for a cellular telephone during the first 10 ms of its RF transmission.

FIG. 7C is a plot 63 of the chirp waveform of a cellular telephone with ESN manufacturing code 130 (for example, the phone having transmitter 6a in FIG. 1) and FIG. 8C is a plot of the chirp waveform of a cellular telephone with ESN manufacturing code 195 (for example, the phone having transmitter 6b in FIG. 1). These chirp waveforms were extracted using the signal processing techniques diagrammed in FIG. 2 and FIG. 5.

Figure 6:
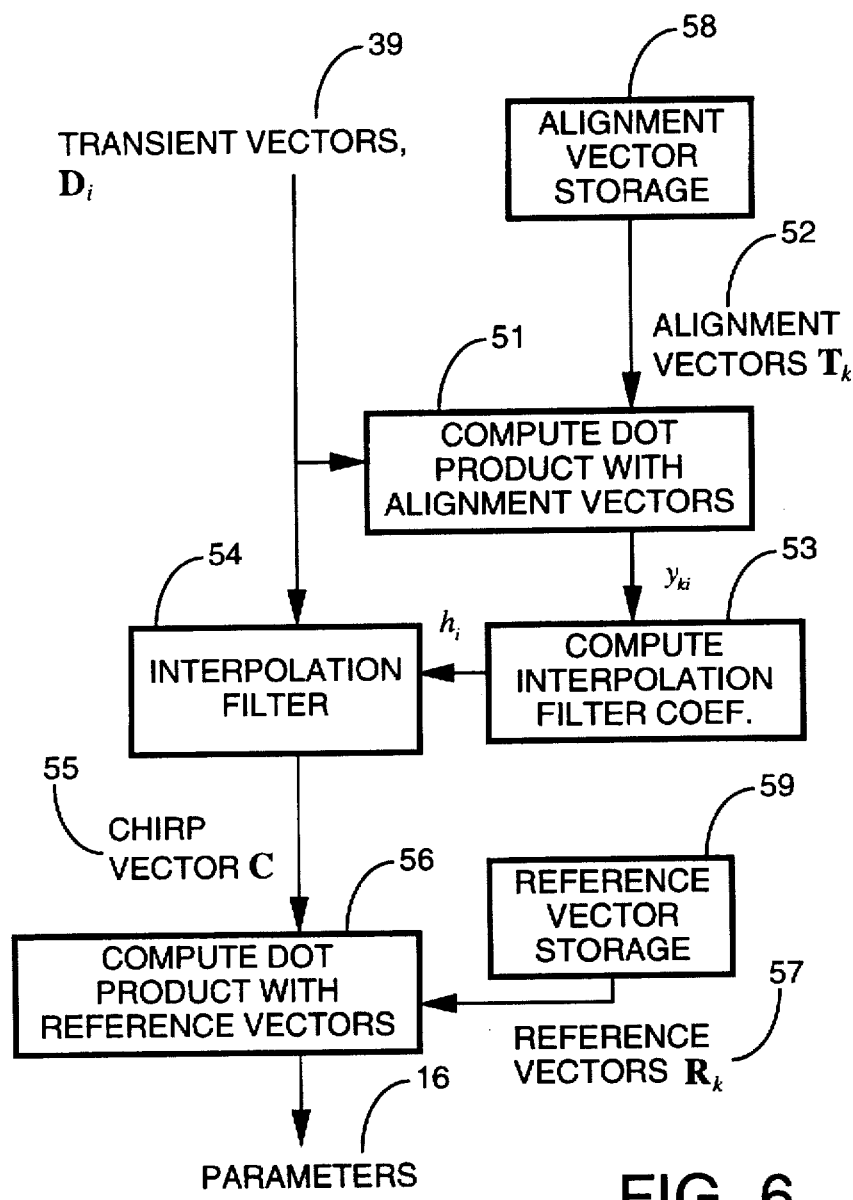
FIG. 6 is an analysis signal processing block diagram that represents how the transient vectors are converted into parameters.

FIG. 6 shows an analysis means that operates on the chirp waveform to derive one or more parameters that characterize the transmitters. It illustrates how the transient vectors 39 are converted into parameters 16. For each alignment vector $T_k$ from alignment vector storage 58 and transient vector $D_i$ a dot product $Y_{ki}$ is computed. The alignment vectors are typical chirp vectors that have been observed previously. A large dot product result is indicative of good time alignment between the alignment vector and the chirp vector. The alignment vector, k, with the largest dot product in absolute value is selected as the input to computing block 53 and three filter coefficients $h_0$, $h_1$, and $h_2$, are computed in block 53 from the $Y_{k0}$, $Y_{k1}$, and $Y_{k2}$ inputs. The interpolation filter 54 time shifts the transient vectors 39 to time align with the selected alignment vector:

$$C=D_0h_0+D_1h_1+D_2h_2 \qquad \text{Eq. (23)}$$

For example, for dot products of $Y_{20}=5$, $y_{21}=8$, and $Y_{22}=5$ (which have symmetry about $Y_{21}$), the filter coefficients would be $h_0=0$, $h_1=1$, and $h_2=0$. For dot products of $y_{10}=-4$, $y_{11}=-9$, and $y_{12}=-9$ (which have two dot products of equal magnitude), the filter coefficients would be $h_0=0$, $h_1=0.5$, and $h_2=0.5$. The interpolation filter reduces the error generated when estimating the start of transient. If the start of transient is consistently accurate, then fixed filter coefficients of $h_0=0$, $h_1=1$, and $h_2=0$ can be used. For each reference vector $R_i$ 57 from reference vector storage 59, a second dot product is computed 56 with the chirp vector C yielding parameter $P_i$. There are as many parameters and reference vectors as alignment vectors. The elements of each reference vector are selected in advance to minimize the average difference between the corresponding parameter and its mean value when the received signal comes from the same transmitter and to maximize the average difference between the means of the corresponding parameter when the received signal comes from different transmitters. Thus, if there were 5 general families of transmitters, including families #1, #2, ...., #5, then 5 parameters would be derived, from 5 reference vectors and 5 alignment vectors. When the received signal came from family #2, alignment vector #2 would be chosen, the dot product yielding parameter #2 would be large, and the other parameters would be relatively small. The dot product is calculated in calculation block 56 where the calculation is a matrix multiplication between a reference matrix formed by the transpose of K reference vectors each N elements long and the chirp vector which is N elements long to yield a parameter vector of K elements. This is a dimensionality reduction from N to K. One technique to select the reference vectors is Fisher's linear discriminant as described by Richard O. Duda and Peter E. Hart in "Pattern Classification and Scene Analysis," John Wiley & Sons, 1973, particularly pages 114 to 126.

By way of summary, the transient analysis system for RF transmitters of the present invention does not use the final frequency, natural period, nor damping factor to characterize the transient, but rather the present invention use the degree of correlation of the reference vectors with the chirp vector.

For the chirp waveform of FIG. 7C corresponding to a specific cellular telephone with ESN manufacturing code 130, two parameters were extracted: $p_1=-19.63$ and $P_2=-0.66$. For the chirp waveform of FIG. 8C for a different cellular telephone with ESN manufacturing code 195, the same two parameters were extracted with respective values: $p_1=-2.30$ and $P_2=-23.82$. The FIG. 7C and FIG. 8C examples are representative and demonstrate that two different cellular telephones have different chirp waveforms and the transients of these waveforms can be characterized by parameters that are substantially different from one another. Some cellular phones may not have a readily processable transient, but such phones still would be characterized by having parameters $p_1$ and $P_2$ near zero which still permits such phones without transients to be distinguished from phones with transients.

While the invention has been particularly shown and described with reference to preferred embodiments thereof it will be understood by those skilled in the art that various changes in form and details may be made therein without departing from the spirit and scope of the invention.

I claim:

1. An apparatus for determining the transient characteristics of a radio transmitter that transmits a signal comprising:

receiving means for receiving the transmitted signal and producing therefrom a down-converted signal;

converting means for digitizing the down-converted signal to generate a pre-detection intermediate frequency sequence;

processing means for processing the pre-detection intermediate frequency sequence to extract a chirp waveform; said processing means including, transforming means for converting the pre-detection intermediate frequency sequence into a complex pre-detection intermediate frequency sequence;

primary demodulation means for multiplying the complex pre-detection intermediate frequency sequence by a delayed conjugated version of the complex pre-detection intermediate frequency sequence;

filtering means for operating on the output of the primary demodulation means to produce a complex auto-correlation sequence;

secondary demodulation means for multiplying the complex auto-correlation sequence by a delayed conjugated version of the complex auto-correlation sequence; and arc-tangent means for finding an argument of the output from the secondary demodulation means to form a chirp waveform, and analysis means for analyzing the chirp waveform to derive one or more parameters that characterize said transmitter.

2. The apparatus of claim 1 that further includes: determining means for determining a portion of the chirp waveform to analyze.

3. The apparatus of claim 1 wherein the radio transmitter is a cellular telephone.

4. The apparatus of claim 1 wherein the analysis means further includes:

calculation means for calculating a dot product between the chirp waveform and a reference vector to form said one or more parameters.

5. The apparatus of claim 1 that further includes:

comparison means for determining the likelihood that said parameters are typical for said transmitter.

6. An apparatus for determining the transient characteristics of a radio transmitter that transmits an RF signal comprising:

receiving means for receiving the RF signal and producing therefrom a down-converted signal;

converting means for digitizing the down-converted signal to generate a pre-detection intermediate frequency sequence;

processing means for processing the pre-detection intermediate frequency sequence to extract a complex auto-correlation sequence; said processing means including, transforming means for converting the pre-detection intermediate frequency sequence into a complex pre-detection intermediate frequency sequence;

demodulation means for multiplying the complex pre-detection intermediate frequency sequence by a delayed conjugated version of the complex pre-detection intermediate frequency sequence; and filtering means for operating on the output of the demodulation means to form said complex auto-correlation sequence; and analysis means for analyzing the complex auto-correlation sequence to derive one or more parameters that characterize said transmitter.

7. The apparatus of claim 6 that further includes:

determining means for determining a portion of the complex auto-correlation sequence to analyze.

8. A wireless subscriber authorization system including, a plurality of wireless subscriber units where each wireless subscriber unit includes an RF transmitter for transmitting a transmitted signal, a receiver for receiving each transmitted signal and producing therefrom, for each transmitted signal, a down-converted signal, apparatus for determining the transient characteristics of each RF transmitter comprising:

converting means for digitizing the down-converted signal to generate a pre-detection intermediate frequency sequence;

processing means for processing the pre-detection intermediate frequency sequence to extract a chirp waveform; said processing means including, mixing means for down-converting the pre-detection intermediate frequency sequence, z(k), to form a frequency shifted sequence, w(k), as follows:

$$w(k) = e^{-j2\pi \frac{f_{if}}{F_s} k} z(k)$$

filtering means for removing negative frequency components of z(k) to form a complex pre-detection intermediate frequency sequence, x(n), as follows:

$$x(n) = \sum_{i=0}^{I-1} h_i w(nD' - i)$$

where D' is a decimation index and $h_i$, represents filter coefficients, primary demodulation means for multiplying the complex pre-detection intermediate frequency sequence, x(n), by a delayed conjugated version, x*(n−1), of the complex pre-detection intermediate frequency sequence to form a primary demodulation output, b(n), as follows:

$$b(n)=x^*(n-1)x(n)$$

decimating means for decimating and filtering said primary demodulation output, b(n), to form a decimated waveform, e(m), as follows:

$$e(m) = \frac{1}{K} \sum_{i=0}^{K-1} b(mD - i)$$

where K is the filtering length and D is the decimation index.

lowpass filter means for lowpass filtering the decimated waveform, e(m), to form the complex auto-correlation sequence, g(m), as follows:

$$g(m) = \sum_{i=0}^{L-1} l_i e(m - i)$$

where $l_i$ represent lowpass filter coefficients and L is the filter length, amplifier means for adjusting the amplitude of the complex auto-correlation sequence, g(m), by a factor of $1/a^2$ to form the adjusted complex auto-correlation sequence, s(m), as follows:

$$s(m) = \left[ \frac{1}{a^2} \right] g(m)$$

secondary demodulation means for multiplying the adjusted complex auto-correlation sequence, s(m), by a delayed conjugated version, s*(m−1), of the complex auto-correlation sequence to form a secondary demodulation sequence, q(m) as follows:

$$q(m)=s(m)s^*(m-1)$$

arc-tangent means for finding an argument of said secondary demodulation sequence, q(m), to form said processing waveform as a chirp waveform, d(m), as follows:

$$d(m) = \frac{1}{D} arg[q(m)]$$

analysis means for analyzing the chirp waveform to derive one or more parameters that characterize said transmitter;

subscriber authorization means for processing said parameters to determine if each of said wireless subscriber units is authorized.

9. A wireless subscriber authorization system including, a plurality of wireless subscriber units where each wireless subscriber unit includes an RF transmitter for transmitting a transmitted signal, a receiver for receiving each transmitted signal and producing therefrom, for each transmitted signal, a down-converted signal, apparatus for determining the transient characteristics of each RF transmitter comprising:

converting means for digitizing the down-converted signal to generate a pre-detection intermediate frequency sequence;

processing means for processing the pre-detection intermediate frequency sequence to extract a chirp waveform;

analysis means for analyzing the chirp waveform to derive one or more parameters that characterize said transmitter; said analysis means including, transient vector means for processing said chirp waveform, d(m), to form transient vectors, $D_i$, including $D_0$, $D_1$, and $D_2$, alignment vector storage means for storing alignment vectors $T_k$, first computational means for computing the dot product, $y_{ki}$, of the alignment vectors, $T_k$, and the transient vectors, $D_i$, interpolation means using the dot product, $y_{ki}$, to form the filter coefficients $h_0$, $h_1$, and $h_2$, filter means using the filter coefficients $h_0$, $h_1$, and $h_2$, to filter the transient vectors, $D_i$, to form a chirp vector, C, as follows:

$$C = D_0 h_0 + D_1 h_1 + D_2 h_2$$

reference vector storage means for storing reference vectors $R_k$, second computational means for computing the dot product of the reference vectors, $R_k$, and the transient vectors, $D_i$, to form said parameters as $p_i$; and subscriber authorization means for processing said parameters to determine if each of said wireless subscriber units is authorized.

10. The apparatus of claim 9 wherein said transient vectors, $D_i$, including $D_0$, $D_1$, and $D_2$, where M is a sample number for the start of the transient, are given as follows:

$$D_0 = \begin{bmatrix} d(M+0) \\ d(M+1) \\ \cdot \\ \cdot \\ d(M+N-1) \end{bmatrix}, D_1 = \begin{bmatrix} d(M+1) \\ d(M+2) \\ \cdot \\ \cdot \\ d(M+N) \end{bmatrix}, D_2 = \begin{bmatrix} d(M+2) \\ d(M+3) \\ \cdot \\ \cdot \\ d(M+N+1) \end{bmatrix}.$$

11. A wireless subscriber authorization system including, a plurality of wireless subscriber units where each wireless subscriber unit includes an RF transmitter for transmitting a transmitted signal, a receiver for receiving each transmitted signal and producing therefrom, for each transmitted signal, a down-converted signal, apparatus for determining the transient characteristics of each RF transmitter comprising:
converting means for digitizing the down-converted signal to generate a pre-detection intermediate frequency sequence;
processing means for processing the pre-detection intermediate frequency sequence to extract a complex auto-correlation sequence; said processing means including,
transfomring means for converting the pre-detection intermediate frequency sequence into a complex pre-detection intermediate frequency sequence;
demodulation means for multiplying the complex pre-detection intermediate frequency sequence by a delayed conjugated version of the complex pre-detection intermediate frequency sequence to form a demodulation output;
filtering means for filtering said demodulation output to produce said processing waveform as a complex auto-correlation sequence, and
analysis means for analyzing the complex auto-correlation sequence to derive one or more parameters that characterize said transmitter;
subscriber authorization means for receiving said parameters and for processing said parameters to determine if each of said wireless subscriber units is authorized.

12. In a wireless subscriber authorization system including a plurality of wireless subscriber units where each wireless subscriber unit includes an RF transmitter for transmitting a transmitted signal and including a receiver for receiving each transmitted signal and a processor for producing therefrom, for each transmitted signal, a chirp waveform, an authorization method comprising:
determining the transient characteristics of each RF transmitter by analyzing the chirp waveform to derive one or more parameters that characterize said transmitter;
processing said parameters to determine if each of said wireless subscriber units is authorized, said processing step including, a mixing step for down-converting the pre-detection intermediate frequency sequence, z(k), to form a frequency shifted sequence, w(k), as follows:

$$w(k) = e^{-j2\pi \frac{f_{if}}{F_s} k} z(k)$$

a filtering step for removing negative frequency components of z(k) to form a complex pre-detection intermediate frequency sequence, x(n), as follows:

$$x(n) = \sum_{i=0}^{I-1} h_i w(nD' - i)$$

where D' is a decimation index and $h_i$ represents filter coefficients, a primary demodulation step for multiplying the complex pre-detection intermediate frequency sequence, x(n), by a delayed conjugated version, x*(n−11), of the complex pre-detection intermediate frequency sequence to form a primary demodulation output, b(n), as follows:

$$b(n) = x^*(n-1)x(n)$$

a decimating step for decimating and filtering said primary demodulation output, b(n), to form a decimated waveform, e(m), as follows:

$$e(m) = \frac{1}{K} \sum_{i=0}^{K-1} b(mD - i)$$

where K is the filtering length and D is the decimation index, a lowpass filter step for lowpass filtering the decimated waveform, e(m), to form the complex auto-correlation sequence, g(m), as follows:

$$g(m) = \sum_{i=0}^{L-1} l_i e(m - i)$$

where $l_i$ represent lowpass filter coefficients and L is the filter length, an amplifier step for adjusting the amplitude of the complex auto-correlation sequence, g(m), by a factor of $1/a^2$ to form the adjusted complex auto-correlation sequence, s(m), as follows:

$$s(m) = \left[ \frac{1}{a^2} \right] g(m)$$

a secondary demodulation step for multiplying the adjusted complex auto-correlation sequence, s(m), by a delayed conjugated version, s*(m−1), of the complex auto-correlation sequence to form a secondary demodulation sequence, q(m) as follows:

$$q(m) = s(m)s^*(m-1)$$

an arc-tangent step for finding an argument of said secondary demodulation sequence, q(m), to form said processing waveform as a chirp waveform, d(m), as follows:

$$d(m) = \frac{1}{D} arg[q(m)].$$

* * * * *